United States Patent [19]
Vancraeynest

[11] Patent Number: 5,239,496
[45] Date of Patent: Aug. 24, 1993

[54] DIGITAL PARALLEL CORRELATOR

[75] Inventor: Jan P. Vancraeynest, White Plains, N.Y.

[73] Assignee: NYNEX Science & Technology, Inc., White Plains, N.Y.

[21] Appl. No.: 457,363

[22] Filed: Dec. 27, 1989

[51] Int. Cl.$^5$ .................... G06F 15/336; G06K 5/04
[52] U.S. Cl. ............................... 364/728.03; 375/1
[58] Field of Search ............ 364/728.03, 175.09; 375/1, 96; 371/40.1; 340/146.2; 380/34, 42, 46, 47

[56] References Cited

U.S. PATENT DOCUMENTS

| | | | |
|---|---|---|---|
| 3,903,405 | 9/1975 | Gaskill, Jr. | 235/152 |
| 4,032,885 | 6/1977 | Roth | 340/146.1 |
| 4,484,299 | 11/1984 | Lambourn et al. | 364/724 |
| 4,559,606 | 12/1985 | Jezo et al. | 364/728 |
| 4,707,839 | 11/1987 | Andren et al. | 375/1 |
| 4,785,410 | 11/1988 | Hamatsu et al. | 364/717 |
| 4,930,139 | 5/1990 | Chandler et al. | 375/1 |
| 5,020,113 | 5/1991 | Lo et al. | 364/728.03 |
| 5,022,047 | 6/1991 | Dixon et al. | 375/1 |
| 5,090,023 | 2/1992 | Watanabe | 375/1 |

OTHER PUBLICATIONS

TMC2220/TMC2221 "CMOS Programmable Digital Correlators", TRW LSI Products, Inc., 1988, N2.

*Primary Examiner*—Jerry Smith
*Assistant Examiner*—Chuang D. Ngo
*Attorney, Agent, or Firm*—Kenneth Rubenstein; Loren C. Swingle

[57] ABSTRACT

An improved digital parallel correlator is disclosed. Illustratively, the inventive correlator utilizes a shift register which receives a signal comprising data bits encoded as chips. At each cycle of the signal, the chips in the shift register are compared to a reference sequence and the number of matches is obtained. Whenever the number of matches exceeds a fixed high threshold or falls below a fixed low threshold, indicating the presence of a binary 1 or binary 0 data bit, the chips in the shift register are set to a predetermined sequence such as the reference sequence or its complement. This amounts to correcting any chips of a bit that are received in error as soon as it is determined that the bit is a binary 1 or binary 0. This enables the high and low thresholds to be located as far as possible from the peak correlation values thereby increasing the number of chips that can be received in error.

16 Claims, 4 Drawing Sheets

DIGITAL PARALLEL CORRELATOR

FIELD OF THE INVENTION

The present invention relates to a parallel correlator with improved performance in discriminating between two or more binary sequences.

BACKGROUND OF THE INVENTION

Digital parallel correlators have a wide variety of uses in the fields of telecommunications and signal processing.

One application of a digital parallel correlator arises in connection with the spread spectrum communication technique. Spread spectrum techniques permit data signals to be extracted from noise with a relatively small error rate. In a spread spectrum system, a binary 1 data bit is represented by a first sequence of binary states or elements called chips and a binary 0 data bit is represented by a second sequence of binary chips. Typically, the second sequence is the complement of the first sequence. Each sequence of binary chips is known as a spreading sequence.

Thus, in the spread spectrum coding technique, the basic unit of data, i.e., the data bit, is encoded by forming a sequence of chips. The chip rate is much higher than the data rate and each chip has a much broader frequency spectrum than a data bit.

At a receiver, a stream of data bits, which has been transmitted using the spread spectrum format, is recovered using a process known as despreading. Despreading involves the use of a correlator circuit for correlating the received signal which comprises chips with a local reference chip sequence. More particularly, the received chips are entered into a shift register and for each chip time period, the received chips are shifted one position in the shift register. At each chip time period, the number of matches between the local reference sequence and the received chips in the shift register is obtained.

Consider the case where at a despreader the reference sequence corresponds to a binary 1 data bit and the complement of the reference sequence corresponds to a binary 0 data bit. In this case, when the number of matches exceeds a predetermined upper threshold, a data detection decision is made indicating the presence of a binary 1 data bit. When the number of matches falls below a predetermined lower threshold, a data detection decision is made indicating the presence of a binary 0 data bit. In between the data decision times, when there are portions of two connective spreading sequences in the shift register (i.e. the end portion of one sequence and the beginning of the next sequence), the number of matches desirably falls in between the high and low thresholds, thus preventing erroneous data decisions.

In a noise free system, the presence of a binary 1 will be indicated at a data decision time by a total match between the received chips in the shift register and the reference sequence. Similarly, the presence of a binary 0 will be indicated at a data decision time by no matches between the received chips in the shift register and the reference sequence. However, in real systems, noise prevents all the chips in a spreading sequence from being correctly received so that binary 1 and binary 0 data decisions are based on whether the number of matches is above or below upper and lower predetermined thresholds, respectively. This process has the effect of averaging out random noise so that the despread signal component is enhanced and the noise component is reduced.

In short, in a spread spectrum communications system, at an encoder or spreader, each data bit in a data bit stream is coded by transmitting a sequence of binary chips. Typically, one such spreading sequence is used to code binary 1 data bits and its complement is used to code binary 0 data bits. The chips representing the data bit stream are modulated onto a carrier using a conventional two-level modulation technique such as a binary phase shifting keying (BPSK) or frequency shift keying (FSK) and transmitted to a decoder or despreader which includes a correlator as described below. At the despreader, the chips are demodulated and correlated with a reference sequence to reconstruct the original data bit stream in the manner described above.

A digital implementation of a correlator, for use, for example, in a spread spectrum system, comprises a shift register for receiving the transmitted chips and a network for calculating the correlation (i.e. number of matches) at every clock interval, based on a comparison between the chips currently in the shift register and a reference sequence. One type of prior art digital correlator is a parallel correlator available from TRW and bearing the model number TMC 2220 or TMC 2221. This correlator determines the number of matches at each clock interval between the chips in the register and the reference sequence. External circuitry may then be utilized to determine if the number of matches is above or below fixed high and low thresholds.

In a spread spectrum system, wherein each bit is encoded by a certain chip sequence or its complement, the last chips of the old bit are still in the shift register and influence the correlation of the first incoming chips of the new bit. The partial correlation values (i.e. the number of matches) during the transitions between bits (e.g. at the transition between a binary 1 and binary 0) force the fixed high and low detection thresholds to be placed close to the peak correlation values. The peak correlation values occur when there is a complete match or complete mismatch between the chips in the shift register and the reference sequence. The placement of the high and low thresholds near the peak correlation values presents a significant problem. The reason is that when the high and low thresholds are near the peak correlation values, the number of chips received in error that can be tolerated is quite limited.

To mitigate this problem in a conventional spread spectrum system, the spreading sequences used to encode the data bits are chosen so that they exhibit partial correlation values which are as far from the peak correlation values as possible. However, in this case noise-induced errors in the received chip stream tend to shift the partial correlation values towards the peak correlation values and thus towards the thresholds.

Several alternative solutions to the problem of partial correlations at the bit transitions have also been proposed, including for example, the use of peak detection instead of high and low thresholds, the use of adaptive thresholds, or the use of serial correlation rather than parallel correlation. Serial correlation requires synchronization between received and generated sequences and hence requires longer preambles to accomplish synchronization, especially for longer sequences. Peak detection also requires timing information. In contrast, in the case of parallel correlation with fixed high and low thresholds, timing information is straightforwardly derived from the threshold crossings.

In view of the foregoing it is an object of the present invention to provide a parallel correlator with fixed high and low thresholds in which the partial correlations are located as far as possible from the peak correlation values so that the fixed thresholds can be placed as far as possible from the peak correlation values.

It is a further object of the invention to provide a parallel correlator with fixed high and low thresholds in which the effect of noise-induced errors in the incoming chip stream on the partial correlations is minimized.

SUMMARY OF THE INVENTION

The present invention is a parallel correlator using fixed high and low thresholds in which the partial correlations at the bit transitions are located far from the peak correlation values by setting the individual elements in the shift register to a predetermined sequence such as the reference sequence or its complement every time the fixed high or low threshold is exceeded. This amounts to correcting any chips of a bit that are received in error as soon as it is determined that a data bit is a binary 1 or a binary 0 thereby substantially minimizing the effect of noise-induced errors in the received chips on the partial correlation values. This permits the fixed high and low thresholds to be placed as far a possible from the peak correlation values thereby increasing the number of chips received in error which can be tolerated.

Alternatively, instead of setting the individual elements in the shift register to the reference sequence or its complement when a threshold is exceeded, the individual elements in the shift register may be set to all binary 1's or all binary 0's. This is appropriate when the reference sequence (and thus the original spreading sequences at the transmitting end) contain approximately equal numbers of binary 1's and binary 0's.

DETAILED DESCRIPTION OF THE INVENTION

In accordance with the spread spectrum encoding technique, each data bit in a data bit stream is mapped into a sequence of chips known as a spreading sequence. Consider the following example
binary 1→(first)110110010100001(last)
binary 0→(first)001001101011110(last)
wherein the spreading sequence for binary 0 is the complement of the spreading sequence for binary 1 and where (first) and (last) indicate the order in which the chips are transmitted. Each chip has a much wider frequency spectrum than a data bit. The spreading sequence corresponding to each bit in the data bit stream is then modulated onto a carrier using a simple two level modulation scheme and transmitted to a remote receiver.

At the receiver, the received signal comprising chips is first demodulated and then correlated with a reference sequence to convert the spreading sequences back into data bits.

Figure 1A:
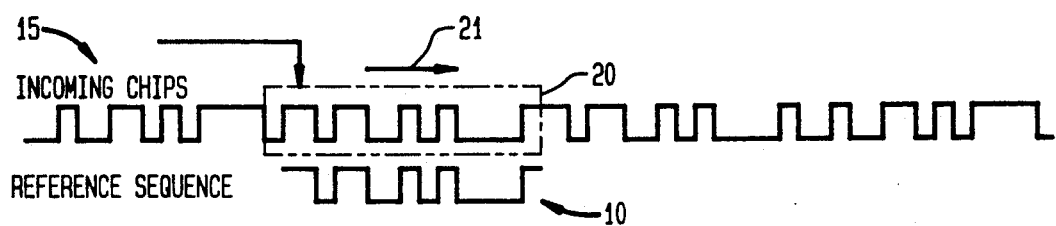
FIGS. 1A and 1B schematically illustrate the correlation of a received signal comprising chips with a reference sequence.

FIG. 1A shows a reference sequence 10 which is the same as the spreading sequence for binary 1 identified above. FIG. 1A also shows the incoming chips 15. The incoming chips 15 are entered into a shift register 20 schematically illustrated in FIG. 1A. The incoming chips are shifted one position in the shift register (i.e. in the direction of arrow 21) at the end of each chip cycle or time period.

Figure 1B:
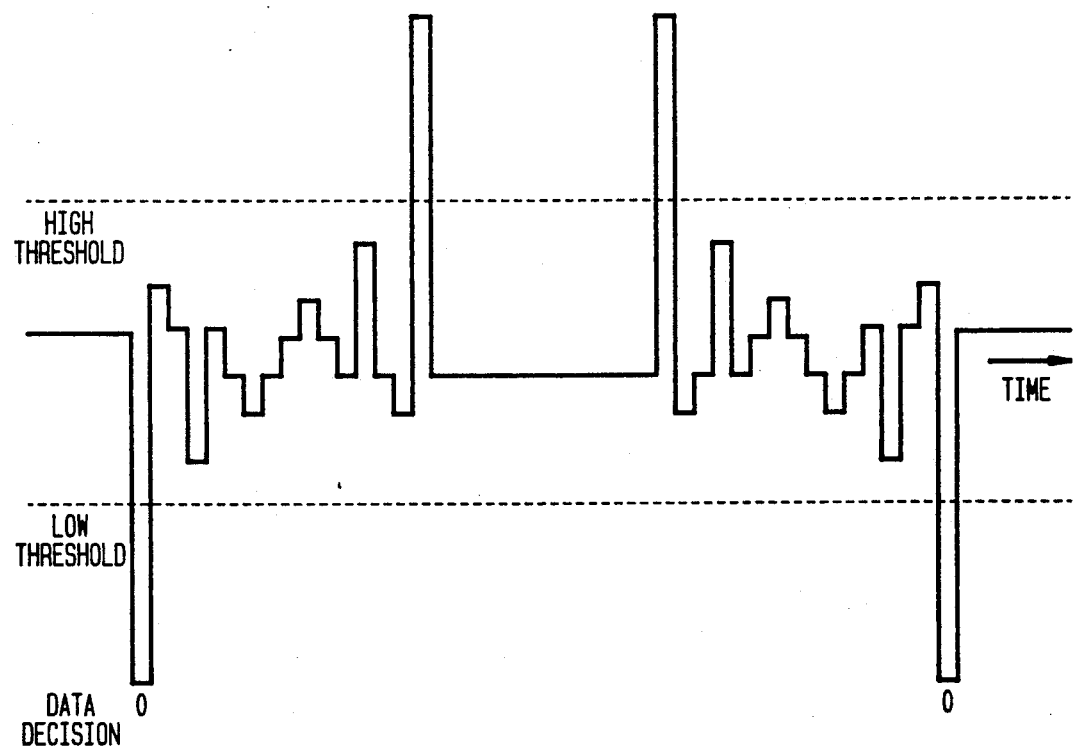

The incoming chips are correlated with the reference sequence. More particularly, at each chip time period, the chip values stored in the shift register are compared with the reference sequence and the number of matches is counted. The number of matches is plotted as a function of time in FIG. 1B. Note, that the plot of FIG. 1B has a fixed high threshold and a fixed low threshold. In any chip time period, when the number of matches exceeds the high threshold, a data detection decision is made indicating the presence of a binary 1 data bit. Similarly, when the number of matches falls below the low threshold, a data detection decision is made indicating the presence of a binary 0 bit. Four such data decisions are illustrated in FIG. 1B.

It should be noted that in this type of correlation method, no externally generated timing information is required. Instead, timing information is derived in a straightforward fashion from the threshold crossings.

In the absence of noise, a binary 1 data bit would be indicated by a complete match between the reference sequence and the received chips in the shift register because the reference sequence is identical to the spreading sequence used to code binary 1 data bits. Similarly, a binary 0 data bit would be indicated by a complete mismatch between the reference sequence and the received bits in the shift register because a binary 0 is encoded with the complement of the reference sequence. However, because in a noisy environment there is a certain chip error rate, a detection decision is made indicating a binary 1 data bit or a binary 0 data bit when the number of matches exceeds or falls below high and low thresholds, respectively.

It is desirable for the high and low thresholds to be placed as far possible from the peak correlation values. The upper peak correlation value occurs when there is a complete match between the chips in the shift register and the reference sequence. Thus, the upper peak correlation value is equal to the number of chips in the reference sequence. The lower peak correlation value is zero matches between the chips in the shift register and the reference sequence. When the thresholds are far away from the peak correlation values, the number of chips received in error which can be tolerated increases.

However, in order to avoid erroneous data decisions, the partial correlations should fall in the range between the two thresholds and not exceed either threshold. As indicated above, the partial correlations are the number of matches which occur between the data decision times when the chips comprising the end of one spreading sequence and the beginning of the next spreading sequence are in the shift register. If a partial correlation value crosses a threshold, an erroneous data decisions results. Thus, the further the thresholds are from the peak correlation values, the more restricted is the range of possible partial correlation values. It should be noted that chips received in error can shift partial correlations towards the peak correlation values in comparison to the corresponding error-free partial correlation values.

In accordance with the present invention, the individual storage elements of the shift register are set to predetermined values whenever the high or low threshold is exceeded to maintain succeeding partial correlation values in the desired range between the thresholds.

Illustratively, the individual storage elements in the shift register are set to all binary 1's or all binary 0's. This is appropriate when the reference sequence (and thus the original spreading sequences at the transmitting end) comprise approximately equal number of binary 1's and binary 0's. In this case, when the chips in the shift register are converted to all binary 1's or all binary 0's, the succeeding partial correlation values are reduced.

Figure 2:
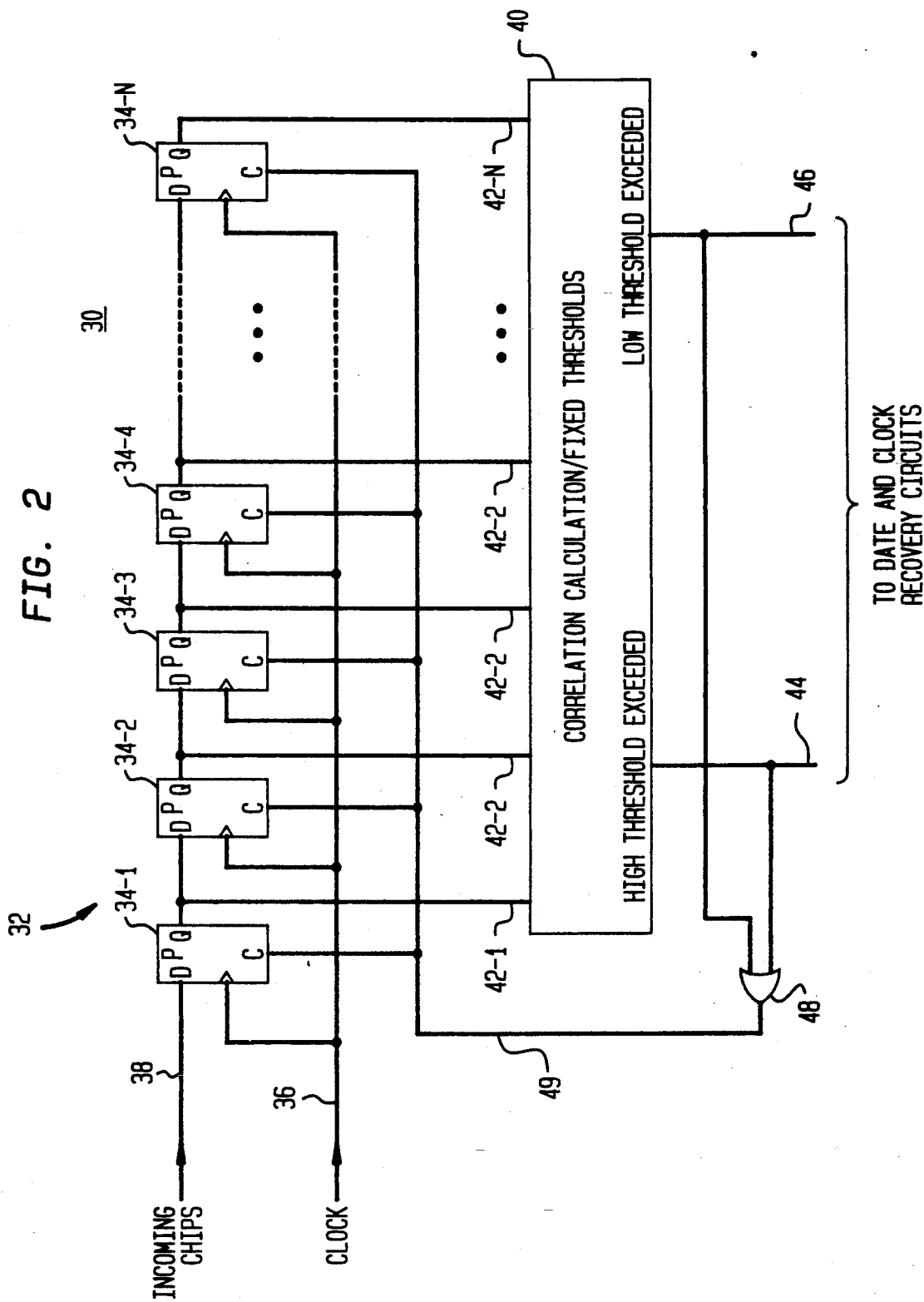
FIG. 2 schematically illustrates a correlator in accordance with an illustrative embodiment of the present invention.

FIG. 2 illustrates a correlator 30 which implements the above-described partial correlation value reduction scheme. The correlator 30 comprises a shift register 32. The shift register 32 is formed from a plurality of storage elements or flip-flops 34-1, 34-2, 34-3, 34-4 ... 34-N. A clock signal is transmitted to the flip-flops 34 via lines 36. The chips arrive on line 38 and at each triggering transition of the clock signal, a chip value is transferred from the Q output of one flip-flop 34 to the D input of the next succeeding flip-flop. In this manner the chips are shifted through the shift register 32.

The correlator 30 includes a correlation calculation circuit 40. At each clock cycle, the values stored in the flip-flops and present at the Q outputs are transmitted via the lines 42-1, 42-2 ... 42-N to the correlation calculation circuit 40. The correlation calculation circuit 40 determines the number of matches between the chips stored in the shift register and the reference sequence. When the high threshold is exceeded a signal is outputted on line 44 and when the low threshold is exceeded a signal is outputted on line 46. As indicated in FIG. 2, signals present on lines 44 and 46 are transmitted to data and clock recovery circuits (not shown).

The signals present on lines 44 and 46 are also transmitted to OR-gate 48. Thus, whenever a signal is present on line 44 or on line 46, i.e. whenever a data detection decision is made, a signal is provided on line 49 at the output of the gate 48. This signal on line 49 is transmitted to the C inputs of the flip-flops 34 to clear all of these flip-flops so that they have a binary zero state. Alternatively, the signal on line 49 may be transmitted to the P input of all the flip-flops 34 to preset all of these flip-flops so that they have a binary 1 state. By converting the chips in the shift register to all binary 1's or all binary 0's, succeeding partial correlation values are maintained in a desired range.

In an alternative embodiment of the invention, instead of setting the shift register to all binary 1's or all binary 0's, after a data decision is made, the chip values in the shift register may, for example, be set to the reference sequence when the high threshold is exceeded or to the complement of the reference sequence when the low threshold is exceeded. This amounts to correcting any chips of a bit that are in error as soon as it is determined whether the bit is a binary 1 or a binary 0.

Figure 3:
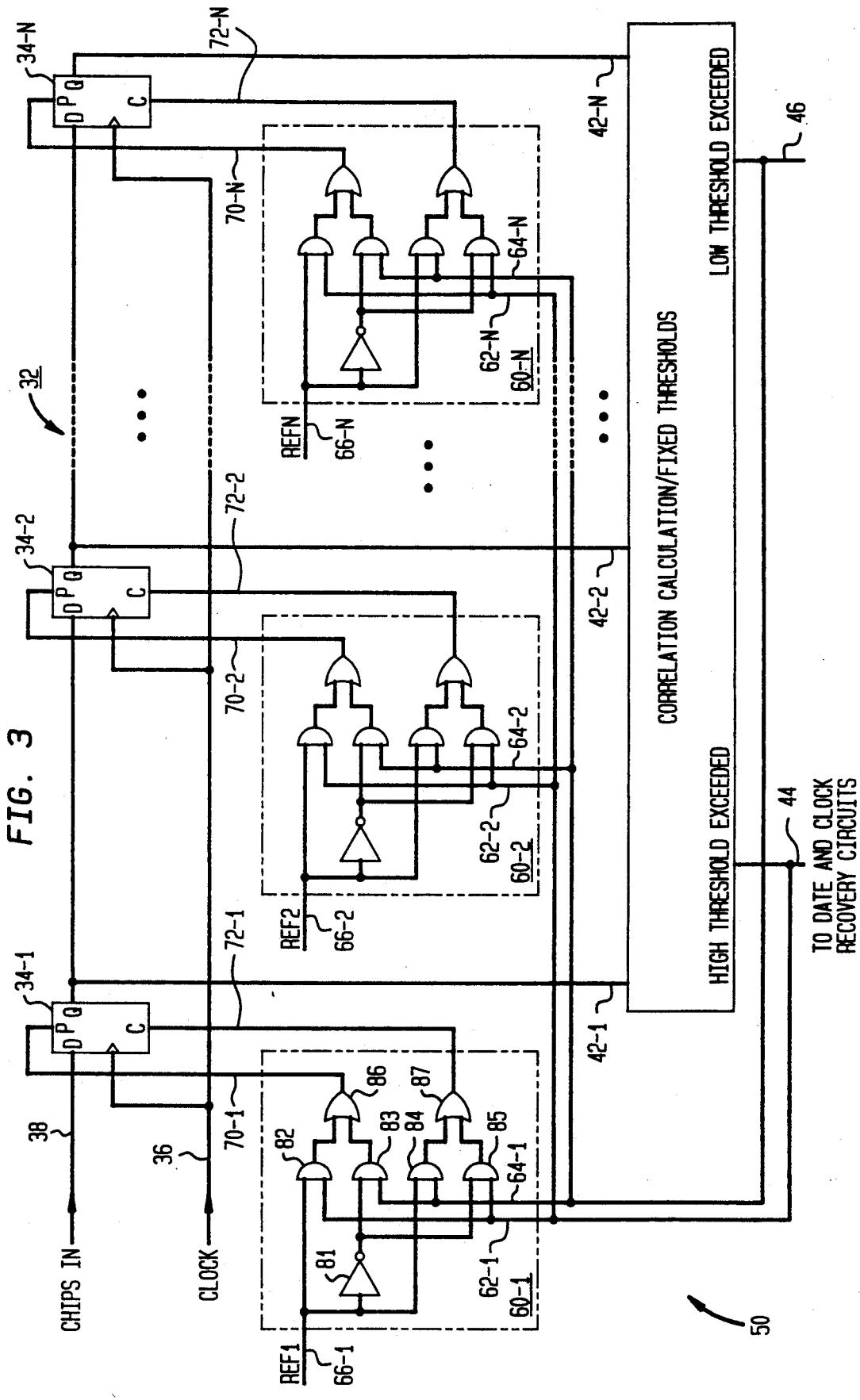
FIG. 3 schematically illustrates an alternative correlator in accordance with an alternative illustrative embodiment of the present invention.

A correlator which implements this scheme is illustrated in FIG. 3. Like elements in FIGS. 2 and 3 have the same identifying numerals. Thus, the correlator 50 of FIG. 3 comprises the shift register 32 which is formed from the flip-flops 34-1, 34-2, ... ,34-N. the chips arrive via line 38 and are shifted from one flip-flop 34 to the next synchronously with the triggering transitions of the clock signal on line 36. At each clock cycle, the values stored in the shift register are transmitted via the lines 42-1, 42-2, ... ,42-N to the correlation calculation circuit 40. The correlation calculation circuit 40 counts the number of matches between the current chip values stored in the shift register and the reference sequence and outputs a signal on line 44 when the high threshold is exceeded and a signal on line 46 when the low threshold is exceeded. The signals on lines 44 and 46 are transmitted to data and clock recovery circuits (not shown).

Associated with the flip-flops 34-1, 34-2, ... .34-N are the logic circuits 60-1, 60-2, ... ,60-N. The logic circuits 60-1, 60-2, ... ,60-N receive via lines 62-1, 62-2, ... ,62-N the signal indicating that the high threshold has been exceeded. Similarly, the logic circuits 60-1, 60-2, ...60-N receive via lines 64-1, 64-2, ... ,64-N, the signal indicating that the low threshold has been exceeded. The logic circuits 60-1, 60-2, ... ,60-N also receive on lines 66-1, 66-2, ... ,66N the corresponding elements of the reference sequence designated REF1, REF2, ... , REFN.

The logic circuits 60-1, 60-2, ... ,60-N operate to insure that each flip-flop is set to the corresponding reference element when the high threshold is exceeded (i.e. binary 1 data bit detected) and to insure that each flip-flop is set to the complement of the corresponding reference element when the low threshold is exceeded (i.e. binary 0 data bit detected). As indicated above, this amounts to correcting any chips received in error as soon as it is determined that a data bit is a binary 0 or a binary 1.

Thus, if the reference element is a binary 1 and the data bit detected is a binary 1, the appropriate logic circuit 60-1, 60-2 ... 60-N outputs a binary 1 signal on the corresponding line 70-1, 70-2 ... 70-N to the P input of the corresponding flip-flop 34-1, 34-2 ... 34-N to preset the flip-flop to the binary 1 state. Similarly, if the reference element is a binary 0 and the data bit detected is a binary 1, the appropriate logic circuit 60-1, 60-2 ... 60-N outputs a binary 1 signal on the corresponding line 72-1, 72-1 ... 72N to the C input of the corresponding flip-flop 34-1, 34-2 ... 34-N to clear the flip-flop to the binary 0 state. In this manner when the high threshold is exceeded, the flip-flops 34 are all set to the reference sequence.

On the other hand, when the low threshold is exceeded, i.e., when a binary 0 data bit is detected, and the reference element is a binary 1, the appropriate logic circuit 60-1, 60-2 ... 60-N outputs a binary 1 signal on the corresponding line 72-1, 72-2 ... 72-N to clear the corresponding flip-flop 34-1, 34-2 ... 34-N to binary 0. Similarly, when a binary 0 data bit is detected and the reference element is a binary 0, the appropriate logic circuit 60-1, 60-2 ... 60-N outputs a binary 1 signal on the corresponding line 70-1, 70-2 ... 70-N to set the corresponding flip-flop 34-1, 34-2 ... 34-N to binary 1. In this manner the circuits 60-1, 60-2 ... 60-N of the correlator 50 of FIG. 3 set the flip-flops 34 to the complement of the reference sequence when a binary 0 data bit is detected.

Each logic circuit 60 comprises an inverter 81, four AND-gates 82, 83, 84 and 85, and two OR-gates 86 and 87. The reference element is transmitted to one input of the gates 82 and 84. The complement of the reference element produced by the inverter 81 is transmitted to one input of the gates 83 and 85. The signal on the corresponding line 62 is transmitted to the other input of the gates 82 and 85 and the signal on the corresponding line 64 is transmitted to the other input of the gates 823 and 84. The outputs of the gates 82 and 83 are connected to the OR-gate 86 and the outputs of the gates 84 and 85 are connected to the OR-gate 87. The output of the OR-gate 86 connects to the corresponding line 70 and the output of the OR-gate 87 connects to the corresponding line 72.

Figure 4:
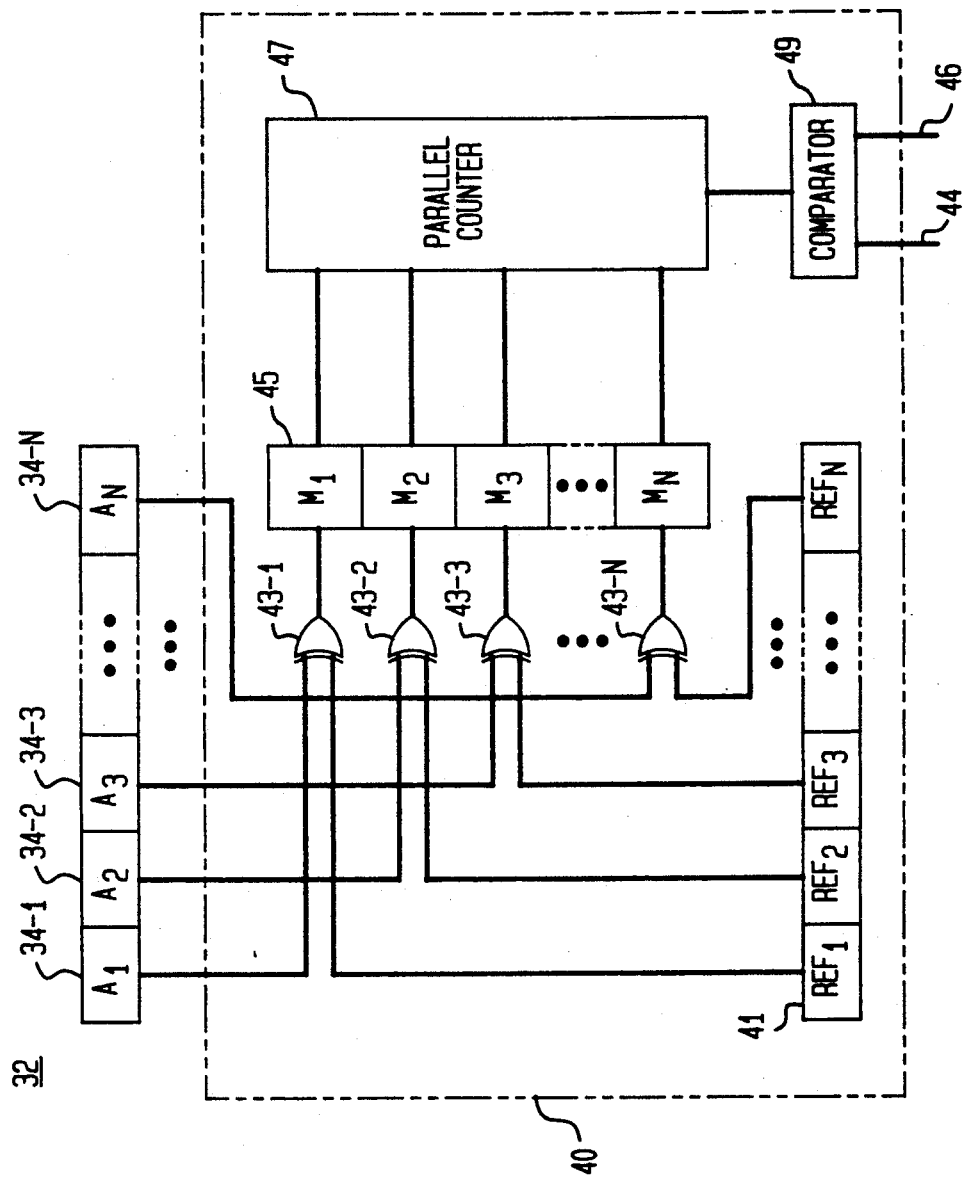
FIG. 4 schematically illustrates the functions performed by a correlation value calculation circuit for use in the correlators of FIGS. 2 and 3.

The correlation calculation circuit 40, discussed in connection with FIGS. 2 and 3 above, is found in commercially available correlator circuits. FIG. 4 schematically illustrates the functions performed by this circuit. At a particular clock cycle, the chips A1, A2 ... AN in the flip-flops 34-1, 34-2 ... 34-N are compared with the corresponding reference elements REF1, REF2, REF3 stored in the register 41. The comparisons are carried out using the exclusive NOR (XNOR) gates 43-1, 43-2, 43-3 ... 43-N. Each XNOR gate outputs a binary 1 if the corresponding chip and reference element are the same and outputs a binary 0 if the corresponding chip and reference element are different. The outputs M1, M2 ... MN of the XNOR gates 43-1, 43-2 ... 43-N are stored in the latch 45. A parallel counter 47 counts the number of binary 1's in the latch 45 and outputs a value to a comparator 49 which determines whether or not the high and low thresholds have been exceeded. The comparator 49 then outputs the appropriate signal on line 44 or line 46 when one of the thresholds is exceeded. The circuit 40 shown in FIG. 4 is intended to schematically illustrate the functions performed by the correlation calculation circuit 40. In a more efficient implementation, the register 41 and XNOR gates 43 are eliminated. The correlations are obtained simply by inverting each chip value corresponding to a binary 0 reference element while leaving unchanged each chip value corresponding to a binary 1 reference element and counting the resulting number of binary 1's to obtain the number of matches.

In short an improved digital correlator has been disclosed. Illustratively, the inventive correlator utilizes a shift register which receives a signal comprising data bits encoded as chips. At each cycle of the signal, the chips in the shift register are compared to a reference sequence and the number of matches is obtained. Whenever the number of matches exceeds a fixed high threshold or falls below a fixed low threshold, indicating the presence of a binary 1 or binary 0 data bit, the chips in the shift register are set to a predetermined sequence such as the reference sequence or its complement. This amounts to correcting any chips of a bit that are received in error as soon as it is determined that the bit is a binary 1 or a binary 0. Alternatively, the chips in the shift register may be set to all binary 1's or all binary 0's.

The result is that the partial correlations at the bit transitions are generally maintained within a certain range thereby enabling the fixed high and low thresholds to be located as far as possible from the peak correlation values.

To attain high enough clock rates particularly with long spreading sequences, it may be necessary to pipeline the correlator depending on the particular technology used for implementation. Illustratively, it may take K cycles, from the time the last chip of a spreading sequence enters the shift register, for the correlator circuitry to make a bit detection decision and to set the chip values in the shift register. In this case, the first K flip-flops of the shift register are not set to the predetermined values because they correspond to the new bit that is coming in and not the bit that was detected in the decision. It is only the chips corresponding to the bit that was detected which are set to predetermined values.

Finally, the above-described embodiments of the invention are intended to be illustrative only. Numerous alternative embodiments may be devised by those skilled in the art without departing from the spirit and scope of the following claims.

The invention claimed is:

1. A correlation device for determining a number of matches between binary elements comprised in a periodic signal and binary elements of a reference sequence comprising
   a shift register for receiving a periodic signal comprising binary elements,
   first circuit means operable during each cycle of said periodic signal for determining a number of matches between said binary elements in said shift register and a reference binary sequence and for outputting an indication signal when said number of matches exceeds a fixed high threshold or falls below a fixed low threshold to indicate the detection of a data bit, and
   second circuit means for setting at least part of said shift register to a predetermined sequence of binary elements each time said indication signal indicates a data bit is detected thereby increasing the distance from said high and low thresholds to peak correlation values of said periodic signal and said reference sequence.

2. The correlation device of claim 1 wherein said predetermined sequence is equal to said reference sequence when said number of matches exceeds said high threshold, and wherein said predetermined sequence is equal to the complement of said reference sequence when said number of matches falls below said low threshold.

3. The correlation device of claim 1 wherein said binary elements comprising said signal received at said shift register are chips used to encode a data bit stream in a spread spectrum format.

4. The correlation device of claim 3 wherein said indication signal is used to form a reconstruction of said data bit stream.

5. The correlation device of claim 1 wherein said shift register comprises a plurality of storage elements, wherein a processing delay of said first and second circuit means is K cycles of said periodic signal, and wherein the first K storage elements of said shift register are not set to predetermined values in response to said indication signal.

6. The correlation device of claim 1 wherein said predetermined sequence is equal to the complement of said reference sequence when said number of matches exceeds said high threshold, and wherein said predetermined sequence is equal to said reference sequence when said number of matches falls below said low threshold.

7. A correlation device for determining a number of matches between binary elements comprised in a periodic signal and binary elements of a reference sequence comprising
   a shift register for receiving a periodic signal comprising binary elements, first circuit means operable during each cycle of said periodic signal for determining a number of matches between said binary elements in said shift register and a reference binary sequence and for outputting an indication signal when said number of matches exceeds a fixed high threshold or falls below a fixed low threshold, and second circuit means for setting at least part of said shift register to a predetermined sequence of binary elements in response to said indication signal, wherein said reference sequence comprises approximately an equal number of binary 1's and binary 0's and said predetermined sequence comprises only binary elements of the same binary value.

8. A correlation device for reconstruction coded data bits in a spread spectrum communication system comprising a shift register for receiving a periodic signal in a spread spectrum format and comprising data bits encoded by sequences of chips, first circuit means operable during each period of said received periodic signal for determining a number of matches between the chips in the shift register and a reference sequence and for reconstructing said data bits by providing a data bit indicating signal when said number of matches exceeds a fixed high threshold or falls below a fixed low threshold, to indicate the detection of a data bit in said periodic signal, and second circuit means responsive to said indicating signal of said first circuit means for setting the chips in at least a part of the shift register to predetermined values to maintain the number of matches between the high and low thresholds during transitions between said data bit indicating signals.

9. The correlation device of claim 7 wherein said shift register comprises a plurality of storage elements, wherein a processing delay of said first and second circuit means is K periods of said periodic signal, and wherein the first K storage elements of the shift register are not set to predetermined values.

10. A method for correlating an encoded signal comprising chips to reconstruct a data bit stream represented by said chips, by determining the number of matches between binary values of said chips and the binary elements of a reference sequence, said method comprising at each cycle of said encoded signal, comparing a group of said chips present in a shift register to a reference sequence and outputting a data bit indication signal if a number of matches between the group of chips and the reference sequence exceeds a fixed upper threshold or falls below a fixed lower threshold to indicate the detection of a data bit in said encoded signal, and in response to the outputting of a data bit indication signal, setting at least a part of the group of chips in the shift register which resulted in the outputting of the data bit indication signal to a predetermined binary sequence thereby increasing the distance from said high and low thresholds to peak correlation values of said encoded signal and said reference sequence.

11. The method of claim 10 wherein said predetermined binary sequence comprises said reference sequence when said number of matches exceeds said high threshold and wherein said binary sequence comprises the complement of said reference sequence when said number of matches falls below said low threshold.

12. The method of claim 10 wherein said predetermined binary sequence comprises the complement of said reference sequence when said number of matches exceeds said high threshold and wherein said binary sequence comprises said reference sequence when said number of matches falls below said low threshold.

13. A method for correlating an encoded signal comprising chips to reconstruct a data bit stream represented by said chips, by determining the number of matches between binary values of said chips and the binary elements of a reference sequence, said method comprising at each cycle of said encoded signal, comparing a group of said chips present in a shift register to a reference sequence and outputting a data bit indication signal if a number of matches between the group of chips and the reference sequence exceeds a fixed upper threshold or falls below a fixed lower threshold, and in response to the outputting of a data bit indication signal, setting at least a part of the group of chips in the shift register which resulted in the outputting of the data bit indication signal to a predetermined binary sequence, wherein said predetermined binary sequence comprises only binary elements of the same binary value.

14. A correlation device for determining a number of matches between binary elements comprised in a periodic signal and binary elements of a reference sequence comprising:

a shift register for receiving a periodic signal comprising binary elements, a first circuit operable during each cycle of said periodic signal for determining a number of matches between said binary elements in said shift register and a reference binary sequence and for outputting an indication signal when said number of matches exceeds a fixed high threshold or falls below a fixed low threshold to indicate the detection of a data bit, and a second circuit for increasing the distance from said high and low thresholds to peak correlation values of said periodic signal and said reference sequence comprising a circuit for setting at least part of aid shift register to a predetermined sequence of binary elements each time said indication signal indicates a data bit is detected.

15. A correlation device for determining a number of matches between binary elements of a periodic signal and binary elements of a reference sequence comprising:

a shift register for receiving the binary elements of said periodic signal, a first circuit operable during each cycle of said periodic signal for determining a number of matches between said binary elements in said shift register and a reference binary sequence and for outputting an indication signal with a high signal component when said number of matches exceeds a fixed high threshold and a low signal component when said number of matches falls below a fixed low threshold, to indicate the detection of a data bit, and a second circuit for increasing the distance from said high and low thresholds to peak correlation values of said periodic signal and said reference sequence comprising at least one OR gate, responsive to aid high and low indication signal components, for outputting a signal to said shift register for setting at least part of said shift register to a predetermined sequence of binary elements each time said high or low indication signal components indicate a data bit is detected.

16. A correlation device for determining a number of matches between binary elements of a periodic signal and binary elements of a reference sequence comprising:

a shift register comprising a plurality of storage locations for receiving the binary elements of said periodic signal, a first circuit operable during each cycle of said periodic signal for determining a number of matches between said binary elements in said shift register and a reference binary sequence and for outputting a high indication signal when said number of matches exceeds a high threshold and a low indication signal when the number of matches falls below a low threshold to indicate the detection of a data bit in said periodic signal, and a second circuit comprising on logic circuit for each storage location of said shift register, each logic circuit including input means for receiving said high and low indication signals from said first circuit and output means connected to a corresponding storage location of said shift register for writing into the storage location a particular bit value in response to said high and low indication signals, thereby enabling the distance from said high and low thresholds to peak correlation values of said periodic signal and reference sequence to be increased.

* * * * *